United States Patent
Bouche

[15] 3,640,711
[45] Feb. 8, 1972

[54] DIFFRACTION PROCESS PHOTOGRAPHY AND RECONSTRUCTION: FIDELITY ENHANCEMENT BY MINIMIZATION OF CROSSTALK AND MOIRE PATTERNS

[72] Inventor: Edmund L. Bouche, Lexington, Mass.
[73] Assignee: Technical Operations, Incorporated, Burlington, Mass.
[22] Filed: July 22, 1969
[21] Appl. No.: 843,312

[52] U.S. Cl. ............................................96/27 H, 355/32
[51] Int. Cl. ....................................................G03b 33/00
[58] Field of Search ......................96/24, 25, 27 H, 17, 118; 178/5.4; 340/324; 355/32; 95/12.2

[56] References Cited

UNITED STATES PATENTS 3,504,606  4/1970  Makovsky..............................355/71

Primary Examiner—Norman G. Torchin
Assistant Examiner—Alfonso T. Suro Pico
Attorney—Rosen & Steinhilper and John H. Coult

[57] ABSTRACT

This disclosure depicts methods and structures for multiplex information photorecording and retrieval with minimization of interference between information channels. More particularly, this disclosure concerns diffraction process methods and structures for recording a plurality of images in superposition on a common recording medium each modulating an azimuthally distinct spatial carrier, and selectively retrieving the component images in a coherent projection system. Stress is placed upon predetermining the spatial frequency and azimuthal orientation of each of the carriers such that interchannel interference during projection is minimized.

34 Claims, 13 Drawing Figures

EDMUND L. BOUCHE'
INVENTOR

By: ROSEN & STEINHILPER
and
JOHN H. COULT
ATTORNEYS

EDMUND L. BOUCHE'
INVENTOR

By: ROSEN & STEINHILPER
and
JOHN H. COULT
ATTORNEYS

DIFFRACTION PROCESS PHOTOGRAPHY AND RECONSTRUCTION: FIDELITY ENHANCEMENT BY MINIMIZATION OF CROSSTALK AND MOIRE PATTERNS

BACKGROUND OF THE INVENTION

Diffraction process photostorage and retrieval systems have been explored sporadically for many years. Robert W. Wood is credited by Herbert E. Ives as having invented the color diffraction process in 1899. The Wood process (U.S. Pat. No. 755,983) involves the formation of a composite photographic record on which red, blue, and green color separation images modulate spatial carriers of like orientation but different spatial frequency. The frequencies of the spatial carriers are selected such that upon retrieval in a coherent projection system an aperture at the location of the first spectral order in the Fourier transform space will receive from each area of the photograph only radiation from the region of the dispersed spectrum produced by the carrier on that area which corresponds to the color of the scene information recorded thereon.

In 1906 Herbert E. Ives attempted to overcome certain crosstalk effects in the Wood system caused by nonlinearities in the photographic recording processes used by avoiding overlapping of red, blue, and green color separation images. Overlap was avoided by sampling each of the color separations at like periodic intervals and interlacing them with a 120° phase displacement to form the composite record. The color separation images were impressed upon spatial carriers of like orientation and different frequency, or like frequency and different orientation to enable the images to be separated by optical Fourier transformation techniques. The Ives system, however, was difficult to implement except in the laboratory under carefully controlled procedures, and is not adaptable to general photographic applications.

Yet another problem associated with diffraction process systems involves the formation of interference patterns, commonly referred to as Moire beats or patterns in retrieved images which result from the overlap in the Fourier plane of energy from separate information channels. The prior art is not known to have addressed itself to the solution of this problem.

OBJECTS OF THE INVENTION

It is an object of this invention to provide systems and methods of diffraction process photography and reconstruction which allow the use of overlapped carriers but which provides for reconstruction of the photographed images with significantly less interchannel interference than is provided by prior art methods.

It is another object to provide methods and apparatus for spectral zonal photography and reconstruction which is adaptable for general photographic applications and which provides reconstructions with minimal degradation due to crosstalk and Moire patterns.

It is another object of this invention to provide diffraction process methods and apparatus of spectral zonal photography and reconstruction which yield displays of enhanced fidelity by utilizing the greater sensitivity of panchromatic photographic emulsions to radiation in the higher energy region of the visible spectrum.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein.

DESCRIPTION OF THE PREFERRED EMBODIMENTS

In order to promote a fuller understanding of the invention and its significance, a brief discussion of the general nature of the diffraction process photostorage and retrieval system with which this invention is concerned will be first engaged.

Figure 1:
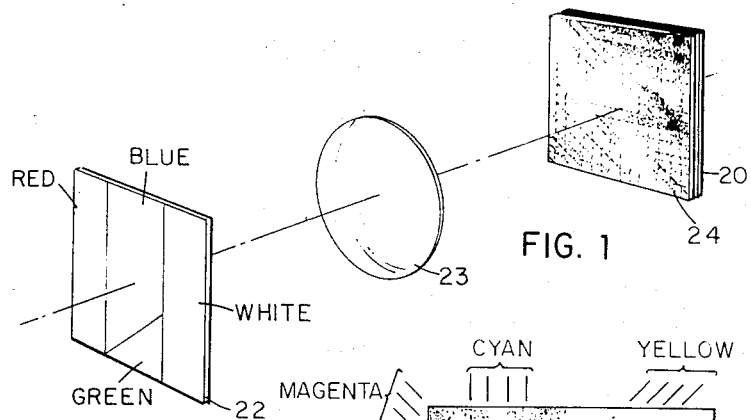
FIG. 1 is a distorted scale schematic perspective view illustrating the recording of a colored scene through a spectral zonal filter so as to impress separate spectral zonal images on azimuthally distinct spatial carriers.

FIG. 1 schematically illustrates a recording process wherein a photosensitive material 20 is exposed to an image of a colored object 22 formed by lens 23 through a spectral zonal encoder 24. The spectral zonal encoder 24, shown schematically in FIG. 2, comprises mutually coextensive periodic arrays of yellow, cyan, and magenta filter elements having direction vectors oriented at −45°, 0°, and 45°, respectively. During the recording operation, the encoder 24 is caused to be multiplied with the object, or an image thereof, preferably by locating the encoder 24 at the image plane of lens 23 in intimate contact with photostorage material 20. The yellow, cyan, and magenta filter elements, respectively, act to impress blue, red, and green color separation information on spatial carriers whose vectorial directions are −45°, 0°, 45° respectively. FIG. 3 represents a record as might be formed by the recording operation depicted in FIG. 1. It is seen that the areas of the object 22 which contain pure primary color information have but a single carrier whose orientation is a function of the orientation of the filter array which is complementary to the particular primary scene color. The white areas of the object 22 contain red, blue, and green information; accordingly, those areas on the record corresponding to the white areas on the object contain three overlapped carriers. As will be discussed in detail hereinafter, it is the overlap of the carriers and the processing of the photographic record in a nonlinear fashion which is the primary cause of crosschannel interference effects.

Figure 3:
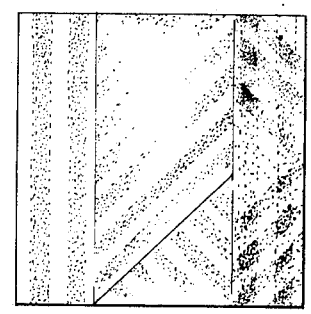
FIG. 3 is a distorted scale representation of the photographic record formed in FIG. 1 through the FIG. 2 filter.
Figure 4:
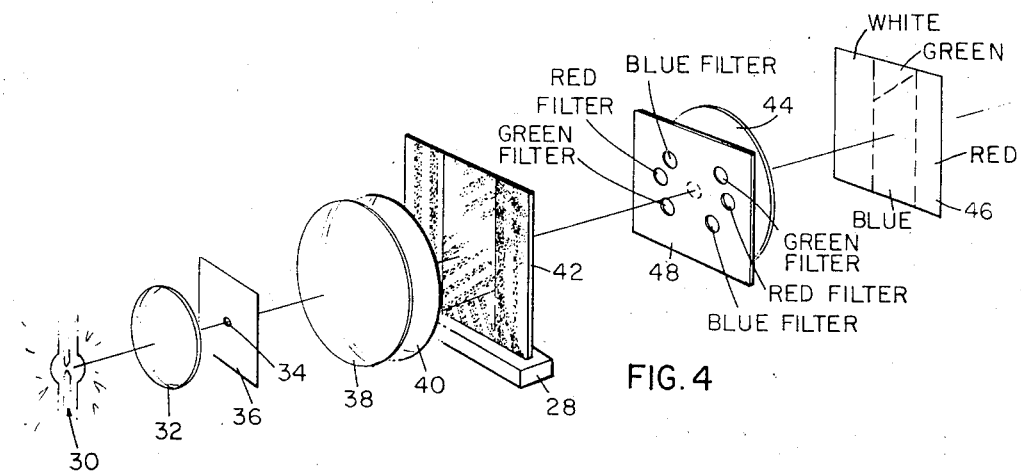
FIG. 4 is a schematic representation of a coherent projection system for reconstructing the scene image in full color from the black-and-white photographic record shown in FIG. 3.

FIG. 4 illustrates in simplified schematic form, a coherent optical projection which might be used to reconstruct a full color display from the FIG. 3 record. The projection system comprises a light source for generating light which is spatially coherent at the film gate 28 at the frequency of the spatial carriers employed. The light source is here shown as comprising an arc lamp 30, a condensing lens 32 for imaging the arc into an aperture 34 of restricted diameter in a mask 36. A collimating lens 38 and a transform lens 40 illuminate the film gate 28 and form an image of the aperture 34 in a space commonly termed the Fourier transform space at which appears a Fraunhofer diffraction pattern of the record 42. A projection lens 44 images the record 42 at an output plane 46. In order to detect the separate color channels and reintroduce the appropriate spectral characteristics in each of the color channels, a spatial filter 48 is located at the Fourier transform plane. The spatial filter 48 transmits only the first spectral orders associated with each of the red, blue, and green channels and contains red, blue, and green transmission filters in the filter openings such that the color separation information in each of the channels is caused to be transmitted to the output plane in visible radiation having the appropriate spectral characteristics. With a simple system such as is shown in FIG. 4, a full-color reconstruction of the photographed scene can be produced from the encoded monochrome record 42.

Figure 5:
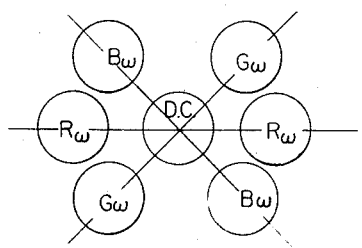
FIG. 5 is an extremely simplified representation of the diffraction pattern which might be produced at the source image plane (the Fourier plane) in the FIG. 4 projection system, the diagram showing only the first spectral orders as they would be formed by a monochromatic point source, but not showing any crosstalk orders.
Figure 6:
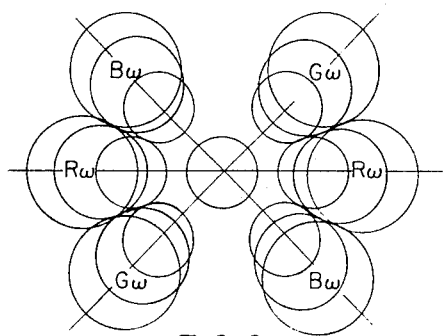
FIG. 6 is similar to FIG. 5 but shows the effect on the diffraction pattern of using a polychromatic source.
Figure 7:
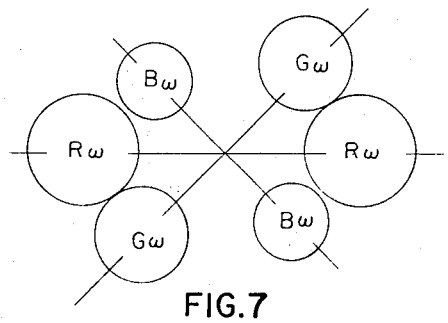
FIG. 7 is a representation of the diffraction pattern shown in FIG. 6 as it might appear after being spectrally and spatially filtered in a projection system such as is shown in FIG. 4.

The nature of the Fourier transform space and the effects that may be achieved by spatial and/or spectral filtering in this space may be better understood by reference to FIGS. 5–7. FIG. 5 is an extremely simplified representation of a Fraunhofer diffraction pattern which might be formed by the FIG. 4 projection apparatus at the source image plane. The diagram shows only the fundamental spectral orders; none of the crosstalk terms normally produced are shown. Further, the FIG. 5 diagram assumes that the source is monochromatic and spatially coherent. The diagram further implies that the spatial carriers used were of equal frequency and that the photostored image is bandlimited to less than one-half the carrier frequency.

FIG. 6 is similar to FIG. 5 but attempts to schematically show the effect of a polychromatic source in radially smearing of the spectral orders due to the wavelength dependence of diffraction phenomena, as explained in more detail hereinafter. FIG. 7 represents the FIG. 6 distribution after being spectrally and spatially filtered by the filter 48 in the FIG. 4 system.

By the nature of diffraction phenomena, the diffraction angle $\alpha$ is: $\sin \alpha = \lambda \omega$          (1)

where $\lambda$ represents the spectral wavelength of the illumination radiation and $\omega$ represents spatial frequencies. The diffracted spectral orders will be formed in the transform space at the delta function positions determined by the transform of the record spatial carriers at radial distances from the pattern axis:

$$R = sm\omega_c \bar{\lambda}$$    (2)

where $s$ is the image distance from lens 40; $\bar{\lambda}$ is the mean wavelength of the illuminating radiation; $m$ represents the diffraction order; and $\omega_c$ is the fundamental grating frequency.

The first orders of each of the diffraction patterns can be considered as being an object spatial frequency spectrum of maximum frequency $\omega_s$ (representing a radius of the order) convolved with a carrier of spatial frequency $\omega_c$. The second order components (not shown) can be thought of as being the convolution of an object spectrum having a maximum spatial frequency $2\omega_s$ with a carrier having a spatial frequency of $2\omega_c$, and so forth. Thus, the various orders of each diffraction pattern may be thought of as being harmonically related, with a spacial frequency $\omega_c$, or an integral multiple thereof, acting as a carrier for the spectrum of spatial frequencies characterizing the object detail. First order spectra only are shown in the drawings; however, it should be understood that second and higher orders are present, but these will be of relatively low intensity.

This invention is directed to the minimization of degradation in reconstructed scene images due to the transmission in the color channels of crosstalk energy from another color channel; this invention is also intended to lessen the effects of Moire beat patterns in reconstructed images resulting from interference between transmitted crosstalk energy and pure color channel energy.

Figure 8:
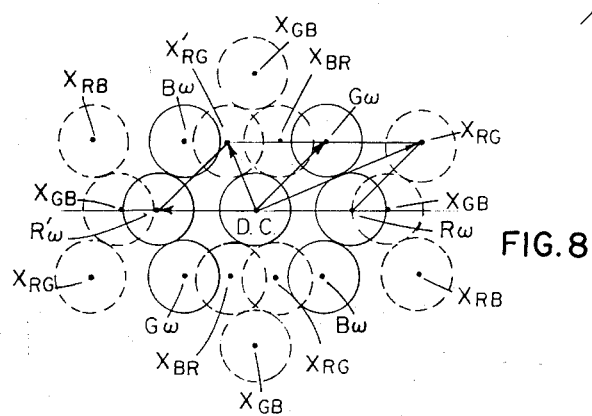
FIG. 8 is an extremely simplified diagram corresponding to FIG. 5 but illustrating the crosstalk introduced when the photographic recording process is nonlinear and the spatial carriers carrying the component color separation images are overlapped.

FIG. 8 is an extremely simplified diagram of the FIG. 5 diffraction pattern but including crosstalk orders caused by the use of photographic processing which is nonlinear, that is, processing to other than $\gamma=-2$. For a detailed discussion on linear photographic recording, see "Linear Multiple Image Storage," by Peter F. Mueller, *Applied Optics* Feb. 1969), Vol. 8, No. 2. In FIG. 8 the crosstalk orders are shown circumscribed by broken lines and are identified according to the color signals which interact to produce the particular crosstalk order. For example, the crosstalk term representing a mixture of the green and red color separation signals, $G\omega$ and $R\omega$, is labeled $X_{RG}$. The location of the crosstalk orders can be found by adding vectors drawn from the origin to the $G\omega$ and $R\omega$ orders. The crosstalk order $X_{RG}$ represents a mixture of the energy from adjacent primary spectral orders. Of greater concern are the crosstalk orders produced by the combination of nonadjacent primary spectral orders. For example, $X'_{RG}$ is a crosstalk order produced by the combination of nonadjacent red channel and green channel energy (see the vectorial diagram illustrating $X'_{RG}$ as being located at the point of vectorial summation of $R'\omega$ and $G\omega$).

It should be kept in mind that FIG. 8 is of the same order of oversimplification as in FIG. 5 and that all of the assumptions made with respect to FIG. have also been made with respect to FIG. 8 except for the assumption of linearity in the formation of the scene record. A more realistic perception of the nature of the diffraction pattern in the Fourier plane can be realized by extrapolating the monochromatic representation in FIG. 8 to a polychromatic representation. In the same way that FIG. 6 illustrates the polychromatic extrapolation of the FIG. 5 diagram, one can envision each of the illustrated primary spectral orders and crosstalk orders in FIG. 8 as being but one of an infinite continuum of orders increasing in size and radial displacement, one for each wavelength of the radiation emanating from the polychromatic light source in the projection system. An attempt to pictorially illustrate the more realistic polychromatic version of FIG. 8 has been avoided on the basis that the diagram would be so complex as to be valueless.

Figure 9:
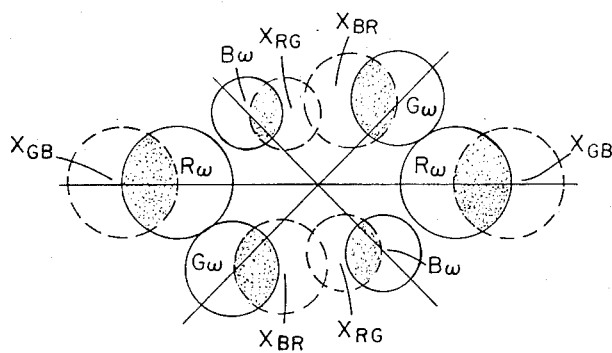
FIG. 9 illustrates a spatially and spectrally filtered diffraction pattern as shown in FIG. 7 but includes only those crosstalk orders which are not capable of being blocked completely by spectral or spatial filtering in the Fourier plane, and which interfere with the primary spectral orders.

It is helpful to keep in mind, however, that only crosstalk orders of interest are those which cannot be blocked by a mask or spectral filter. In the context of the extremely simple FIG. 4 system, the crosstalk of interest is that which will be transmitted through the filter 48. FIG. 9 depicts a simplified diffraction pattern after being spectrally and spatially filtered including only those crosstalk terms which will be transmitted through the FIG. 4 to the output plane and which will therefore cause image degradation.

In accordance with one aspect of this invention it has been found that the amount of crosstalk energy transmitted through the primary spectral orders can be dramatically reduced by preselecting the relative spatial frequencies and azimuthal orientations of the carriers in such a way as to minimize the overlap of crosstalk orders with the spectral orders carrying pure color separation information (hereinafter called primary spectral orders).

Figure 10:
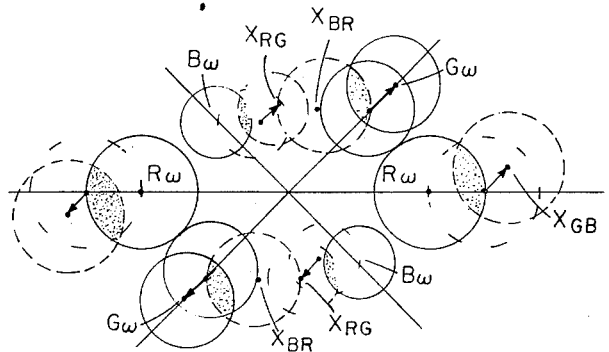
FIG. 10 is a diagram similar to FIG. 9 illustrating the reduction in transmitted crosstalk energy caused by increasing the spatial frequency of the carrier for the green color signal $G\omega$ relative to the spatial frequency of the $B\omega$ and $R\omega$ carriers.

FIG. 10 illustrates the effect on crosstalk suppression of increasing the carrier for the green color separation signal $G\omega$ by approximately 20 percent relative to the spatial frequency of the $R\omega$ and $B\omega$ carriers. The decrease in the amount of transmitted crosstalk can be appreciated by comparing the areas of overlap of the crosstalk and primary spectral orders in FIG. 10 with the areas of overlap shown in FIG. 9. The crosstalk reduction is of even greater magnitude than is manifest from a comparison of FIGS. 9 and 10 since it must be realized that the energy distribution across these spectral orders is not constant, but rather has a Gaussianlike distribution with a relatively rapid fall-off at the peripheries thereof.

It is also important to note that not only have the areas of overlap of the crosstalk and primary spectral orders been decreased by increasing the relative spatial frequency of the green information carrier, but also that the spatial displacement between the interfering orders has been increased, causing the Moire beat frequency (the spatial frequency of the Moire pattern) to increase. Increasing the Moire beat frequency is desirable from the standpoint that the contrast of the pattern becomes less as its frequency approaches the cut off of the transfer function of the viewing, recording, or display system employed.

Figure 11:
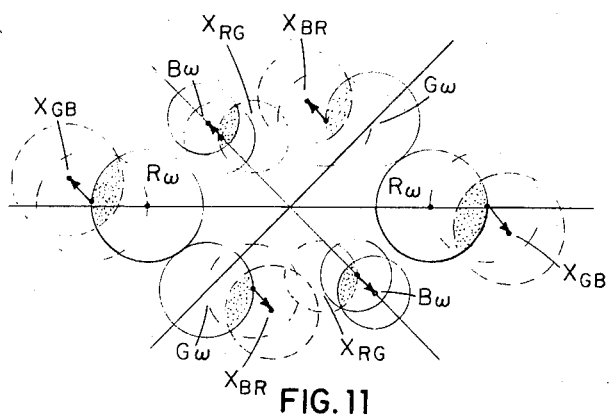
FIG. 11 is a diagram very similar to FIG. 10 but showing the effect of increasing the spatial frequency of the carrier $B\omega$ signal relative to the spatial frequency of the remaining two carriers.

FIG. 11 shows the effect of increasing the spatial frequency of the carrier for the blue signal $B\omega$ relative to the carrier frequencies of the red signal and the green signals. Again, by way of example only, the increase in the $B\omega$ carrier frequency has been shown to be roughly 20 percent.

Figure 12:
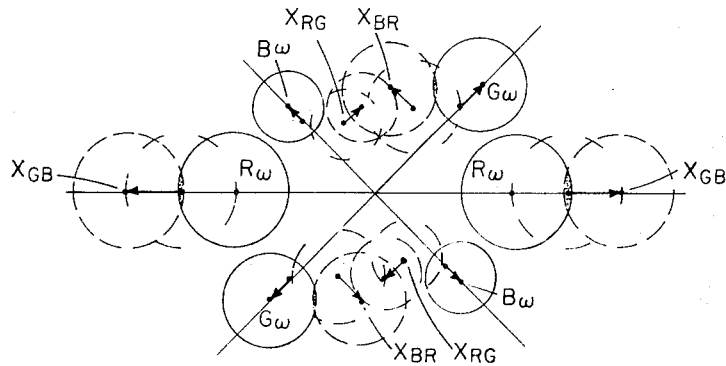
FIG. 12 represents the combined effect of concomitantly increasing the spatial frequency of the $G\omega$ and $B\omega$ carriers.

FIG. 12 shows the effect of increasing the spatial frequency of the carriers for both the green signal $G\omega$ and the blue signal $B\omega$ by approximately 20 percent. In the FIG. 12 diagram it can be seen that the overlap in the Fourier plane of crosstalk and primary spectral orders has been reduced substantially to zero, and the Moire pattern generated at the output plane, assuming sufficient energy to form a pattern, will have a spatial frequency which is twice that of the Moire pattern produced when all carriers have the same spatial frequency, as shown in FIG. 9.

As stated briefly, in FIGS. 10–12, by way of illustration only the carriers for the blue and green signals have been shown as being approximately 20 percent greater than the carrier for the red signal; it should be understood, however, that the degree of frequency increase of the augmented carriers is controlled in practice, inter alia, by the geometry and size of the projection light source, the resolution and modulation transfer function of the recording medium throughout the range of recorded wavelengths, and the spatial frequency bandwidth of the recorded scene. It can be seen, for example, from an inspection of FIG. 10 that the area of overlap between the crosstalk and primary spectral orders might be reduced to a greater degree than is illustrated by further increasing the $G\omega$ carrier frequency, if the modulation transfer function of the recording medium is sufficiently flat to carry the higher carrier frequencies without a compensating degradation of image resolution. It is important to note that this invention enables the greater sensitivity of panchromatic black-and-white emulsions in the higher energy region to be more effectively utilized than in prior art diffraction process systems, since by a preferred practice of this invention the higher frequency carriers are used to carry information associated with the higher energy scene information.

Figure 13:
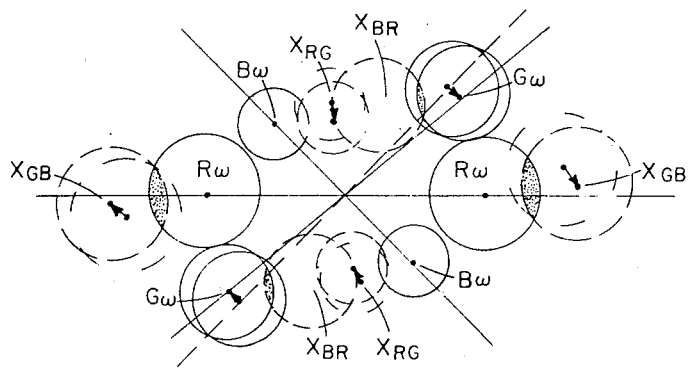
FIG. 13 illustrates, in accordance with the second aspect of this invention, the effect on crosstalk suppression of varying the orientation of one of the carriers.

In accordance with another aspect of this invention, the transmission of crosstalk energy through spatial filter apertures designated to pass primary spectral energy may be reduced by selective adjustment of the azimuthal orientation of one or more of the spatial carriers relative to the others. FIG. 13 illustrates, for example, that displacement of the spatial carrier for the green signal $G\omega$ such that it forms an angle of 38½°, rather than the nominal 45° with respect to the spatial carrier for the red signal $R\omega$, has the effect of decreasing the areas of overlap of crosstalk and primary spectral orders. It should be noted that in FIG. 13, the spatial frequency of the $G\omega$ carrier has been increased by 20 percent relative to the frequency of the $R\omega$ and $B\omega$ carriers. It is evident that there is substantially less latitude in the adjustment of carrier orientation than in adjustment of carrier frequency since adjustment of the carrier azimuth beyond an optimum value will cause deterioration of the reconstructed image fidelity due to overlap of primary spectral orders and/or increasing overlap of crosstalk and primary spatial orders.

Thus, the invention teaches certain principles by which diffraction process multiplex recording and reconstruction systems may be devised to provide scene reproductions of enhanced fidelity. Knowing the scene bandwidth desired to be reproduced, the source size and geometry, and certain other parameters effecting the Fraunhofer diffraction pattern of the scene record which will be formed, a relative spatial frequency an azimuthal orientation of the spatial frequency and azimuthal orientation of the spatial carriers for the color signals can be determined which will minimize the overlap of crosstalk and primary spectral orders and the overlap of adjacent primary spectral orders to make possible reconstructions of enhanced saturation, resolution, and minimized deterioration due to Moire beat patterns.

Figure 2:
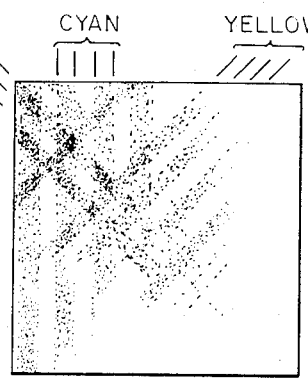
FIG. 2 is a schematic view of the spectral zonal filter shown in FIG. 1.

Once the desired carrier specifications are known, an encoder as shown in FIG. 2 may be fabricated. THe encoder would, of course, have the arrays of filter elements at spatial frequencies and orientations which correspond to the predetermined optimum carrier geometry. Alternatively, a multiplex recording with the desired carrier geometry may be made by sequentially exposing a photosensitive material to the component images to be recorded appropriately spectrally filtered and multiplied with an amplitude grating of the appropriate frequency and orientation.

Certain changes may be made in the above-described methods and structures without departing from the true spirit and scope of the invention herein involved. For example, whereas the invention has been described as being preferably implemented by a three carrier recording and reconstruction, the principles set forth herein are applicable to multiplex recording and reconstruction with other than three carrier-modulating signals. It has been stressed that the above discussion has been maintained at a fundamental level in order that the principles of the invention be explained as clearly as possible and without undue complexity. It is contemplated that the principles of the invention, as set forth in the above embodiments and methods, are applicable to other and more complex systems containing various other filtering arrangements and multiple light sources arranged in various geometries, including systems using off-axis sources so located as to cause a first spectral order of each information channel to be located on axis. It is therefore intended that the subject matter of the above depiction shall be interpreted as illustrative and not in a limiting sense.

What is claimed is:

1. A method of spectral zonal photography, comprising:
exposing a photosensitive material to an additive superposition of first, second, and third spectral separation images characterizing radiation propagating from a scene in three different spectral zones;

during the said exposure operation, causing a periodic grating function of predetermined spatial frequency and of predetermined unique azimuthal orientation to be multiplied with each of said separation images to impress said first, second, and third spectral separation images respectively on first, second, and third spatial carriers capable of being separately detected by Fourier analysis, the direction vector of said second spatial carrier being intermediate the direction vectors of said first and third spatial carriers, said predetermined spatial frequency of at least one of said first and third spatial carriers being greater than the spatial frequency of said second spatial carrier; and developing the exposed photosensitive material to form a record, the respective spatial frequency and orientation of said grating functions being such that an optical Fourier transformation of said record exhibits a minimum of overlap of cross-product orders with first spectral orders of said images.

2. The method defined by claim 1 wherein the angular separation of said first and second spatial carriers and the angular separation of said second and third spatial carriers each lie in the range of 35°–50°.

3. The method defined by claim 2 wherein at least one of said angular separations is substantially 45°.

4. The method defined by claim 3 wherein the angular separation between each of said first and said second and between said second and said third carriers is substantially 45°.

5. The method defined by claim 1 wherein the spatial frequency of said one carrier is substantially 15–25 percent greater than the frequency of said second carrier.

6. The method defined by claim 5 wherein the spatial frequency of said one carrier is substantially 20 percent greater than the frequency of said second carrier.

7. The method defined by claim 1 wherein the spatial frequency of each of said first and third carriers is greater than the spatial frequency of said second carrier.

8. The method defined by claim 7 wherein the spatial frequency of each of said first and third carriers is substantially 15–25 percent greater than the frequency of said second carrier.

9. The method defined by claim 2 wherein the direction vector of said second spatial carrier is intermediate the direction vectors of said first and third spatial carriers and wherein said predetermined spatial frequency of at least one of said first and third carriers is greater than the spatial frequency of said second carrier.

10. The method defined by claim 4 wherein the direction vector of said second spatial carrier is intermediate the direction vectors of said first and third spatial carriers and wherein said predetermined spatial frequency of at least one of said first and third spatial carriers is greater than the spatial frequency of said second carrier.

11. The method defined by claim 10 wherein the spatial frequency of each of said first and third carriers is substantially 15–25 percent greater than the frequency of said second carrier.

12. The method defined by claim 1 wherein said first, second, and third spectral separation images constitute relatively middle wavelength, long wavelength, short wavelength images, respectively, and wherein the direction vector of said second carrier is intermediate the direction vectors of said first and third carriers.

13. The method defined by claim 1 wherein said first, second, and third spectral separation images constitute relatively middle wavelength, long wavelength, and short wavelength images.

14. The method defined by claim 1 wherein the said spatial carriers on which said first, second, and third spectral separation images are impressed are introduced by multiplying said color separation images with a spectral zonal encoder comprising first, second, and third mutually coextensive periodic arrays of filter elements of said predetermined spatial frequency and unique azimuthal orientation, said arrays of filter elements having respective preferential absorption in said three spectral zones.

15. The method defined by claim 14 wherein the direction vector of said second filter array is intermediate the direction vectors of said first and third arrays and wherein the spatial frequency of at least one of said first and third filter arrays is greater than the spatial frequency of said second array.

16. The method defined by claim 15 wherein the angular separations between said first and second filter arrays and between said second and third arrays is substantially 45° and wherein the spatial frequency of each of said first and third arrays is substantially 15–25 percent greater than the spatial frequency of said second array.

17. The method defined by claim 16 wherein said first, second, and third spectral separation images constitute relatively middle wavelength, long wavelength, and short wavelength images.

18. A method of spectral zonal photography and reconstruction, comprising:

exposing a photosensitive material to an additive superposition of first, second, and third spectral separation images characterizing radiation propagating from a scene in three different spectral zones;

during the said exposure operation, causing a periodic grating function of predetermined spatial frequency and of predetermined unique azimuthal orientation to be multiplied with each of said separation images to impress said first, second, and third spectral separation images respectively on first, second, and third spatial carriers capable of being separately detected by Fourier analysis, the direction vector of said second spatial carrier being intermediate the direction vectors of said first and third spatial carriers, said predetermined spatial frequency of at least one of said first and third spatial carriers being greater than the spatial frequency of said second spatial carrier;

developing the exposed photosensitive material to form a record, the respective spatial frequency and orientation of said grating functions being such that an optical Fourier transformation of said record exhibits a minimum of overlap of cross product terms with first spectral orders of said images;

locating the developed record in a beam of light which is substantially coherent at the record;

forming a Fourier transform space at least one diffraction pattern of said record including three angularly separated Dirac delta function arrays respectively convolved with spectra of said first, second, and third spectral separation images; and selectively transmitting at least one spectral order of each of said arrays through said Fourier transform space to form at an output plane an image of said photographed scene.

19. The method defined by claim 18 wherein the angular separation of said first and second spatial carriers and the angular separation of said second and third spatial carriers each lie in the range of 35°–50°.

20. The method defined by claim 19 wherein at least one of said angular separations is substantially 45°.

2. The method defined by claim 20 wherein the angular separations between each of said first and said second and between said second and said third carriers is substantially 45°.

22. The method defined by claim 18 wherein the spatial frequency of said one carrier is substantially 15–25 percent greater than the frequency of said second carrier.

23. The method defined by claim 22 wherein the spatial frequency of each of said first and third carriers is greater than the spatial frequency of said second carrier.

24. The method defined by claim 23 wherein the spatial frequency of each of said first and third carriers is substantially 15–25 percent greater than the frequency of said second carrier.

25. The method defined by claim 19 wherein the direction vector of said second spatial carrier is intermediate the direction vectors of said first and third spatial carriers and wherein said predetermined spatial frequency of at least one of said first and third carriers is greater than the spatial frequency of said second carrier.

26. The method defined by claim 21 wherein the direction vector of said second spatial carrier is intermediate the direction vectors of said first and third spatial carriers and wherein said predetermined spatial frequency of at least one of said first and third spatial carriers is greater than the spatial frequency of said second carrier.

27. The method defined by claim 26 wherein the spatial frequency of each of said first and third carriers is substantially 15–25 percent greater than the frequency of said second carrier.

28. The method defined by claim 18 wherein said first, second, and third spectral separation images constitute relatively middle wavelength, long wavelength, and short wavelength images, respectively, and wherein the direction vector of said second carrier is intermediate the direction vectors of said first and third carriers.

29. The method as defined by claim 18 wherein said first, second, and third spectral separation images constitute relatively middle wavelength, long wavelength, and short wavelength images.

30. A spectral zonal encoder for impressing first, second, and third spectral separation images on first, second, and third spatial carriers, respectively, comprising first, second, and third mutually coextensive periodic arrays of filter elements of predetermined spatial frequency and unique azimuthal orientation, said arrays of filter elements having respective preferential absorption in three spectral zones characterizing said first, second, and third spectral separation images, the direction vector of said second filter array being intermediate the direction vectors of said first and third arrays and the spatial frequency of at least one of said first and third filter arrays being greater than the spatial frequency of said second array.

31. The encoder defined by claim 30 wherein the spatial frequency of said one carrier is substantially 15–25 percent greater than the frequency of said second carrier.

32. The encoder defined by claim 31 wherein the spatial frequency of said one carrier is substantially 20 percent greater than the frequency of said second carrier.

33. The encoder defined by claim 30 wherein the angular separations between said first and second filter arrays and between said second and third arrays is substantially 35°–50° and wherein the spatial frequency of each of said first and third arrays is substantially 15–25 percent greater than the spatial frequency of said second array.

34. The encoder defined by claim 33 wherein said first, second, and third arrays of filter elements have yellow, cyan, and magenta spectral characteristics, respectively.

* * * * *

PO-1050
(5/69)

UNITED STATES PATENT OFFICE
CERTIFICATE OF CORRECTION

Patent No. 3,640,711    Dated February 8, 1972

Inventor(s) EDMUND L. BOUCHE

It is certified that error appears in the above-identified patent and that said Letters Patent are hereby corrected as shown below:

Claim 18, column 8, line 23, after "forming" insert --in--;
    After Claim 20, the next claim number should be --21--;
    Claim 23, column 8, line 44, claim "22" should be --18--.

Signed and sealed this 4th day of July 1972.

(SEAL)
Attest:

EDWARD M. FLETCHER, JR.
Attesting Officer

ROBERT GOTTSCHALK
Commissioner of Patents